United States Patent
Merlin et al.

(10) Patent No.: US 6,794,042 B1
(45) Date of Patent: Sep. 21, 2004

(54) BARRIER COATINGS

(75) Inventors: Patrick J. Merlin, Neufvilles (BE);
John E. Wyman, Sanibel, FL (US);
Imtiaz Rangwalla, Andover, MA (US);
Daniel Futter, Brussels (BE); Gary Power, Melbourne (AU); Karen Branch, London (GB)

(73) Assignees: EG Technology Partners, L.P., Wilmington, MA (US); UCB Films PLC, Star House, Watford (GB); Dow Corning Corporation, Midland, MI (US)

(*) Notice: Subject to any disclaimer, the term of this patent is extended or adjusted under 35 U.S.C. 154(b) by 0 days.

(21) Appl. No.: 09/341,254

(22) PCT Filed: Jan. 16, 1998

(86) PCT No.: PCT/BE98/00007
§ 371 (c)(1),
(2), (4) Date: Dec. 17, 1999

(87) PCT Pub. No.: WO98/31719
PCT Pub. Date: Jul. 23, 1998

(30) Foreign Application Priority Data

Jan. 17, 1997 (GB) .............................. 9700905
Jan. 17, 1997 (GB) .............................. 9700988

(51) Int. Cl.$^7$ .............................................. B29D 22/00
(52) U.S. Cl. ................... 428/423.1; 428/447; 524/81; 524/220; 524/221; 524/591
(58) Field of Search .............................. 428/423.1, 447; 524/81, 220, 221, 591; 522/46, 106; 525/420, 423, 424, 425, 426, 427, 431; 528/271, 422

(56) References Cited

U.S. PATENT DOCUMENTS

| | | | |
|---|---|---|---|
| 2,146,210 A | 2/1939 | Graves | 260/23 |
| 2,721,873 A | 10/1955 | Mackenzie et al. | 260/448.2 |
| 3,225,013 A | 12/1965 | Fram | 260/78 |
| 3,655,633 A | 4/1972 | Saam | 260/79 |
| 3,728,215 A | 4/1973 | Espy | 162/167 |
| 4,032,487 A | 6/1977 | Columbus | 260/17 |
| 4,086,209 A * | 4/1978 | Hara et al. | 260/49 |
| 4,483,891 A | 11/1984 | Cerny | 428/35 |
| 4,569,879 A | 2/1986 | Groves | 428/198 |
| 4,761,435 A | 8/1988 | Murphy et al. | 522/46 |
| 4,943,600 A | 7/1990 | Noren et al. | 522/106 |
| 5,017,406 A | 5/1991 | Lutz | 427/54.1 |
| 5,215,822 A | 6/1993 | Wyman et al. | 428/447 |
| 5,262,236 A * | 11/1993 | Brannon | 428/378 |
| 5,354,829 A * | 10/1994 | Swisher et al. | 528/10 |
| 5,449,552 A | 9/1995 | Bochow et al. | 428/323 |
| 5,744,001 A * | 4/1998 | Linhart et al. | 162/164.3 |
| 6,399,171 B1 * | 6/2002 | Merlin et al. | 428/36.7 |
| 6,514,584 B1 * | 2/2003 | Merlin et al. | 428/36.7 |

FOREIGN PATENT DOCUMENTS

| | | |
|---|---|---|
| EP | 0 262 464 | 4/1988 |
| JP | 7-18221 | 1/1995 |

* cited by examiner

Primary Examiner—Sandra M. Nolan
(74) Attorney, Agent, or Firm—Alan Zombeck

(57) ABSTRACT

The present invention teaches a composition which provides gas, flavor, and aroma barrier to substrates, where the composition is formed by mixing an ethylenically unsaturated acid and a polyamine, wherein said polyamine optionally has a crosslinker reacted therein, and wherein said polyamine has four or more A, B, or C units, where:

A is an —$R^2$—N($R^1$)$_2$ unit, B is an —$R^1$—N($R^2$—)$_2$ unit, and C is an (—$R^2$)$_3$N— unit, where:

$R^1$ is independently selected from hydrogen, alkyl, substituted alkyl, aryl, substituted aryl, arylalkyl, and alkylaryl, and $R^2$ is independently selected from the group consisting of: linear or branched alkylene groups or substituted alkylene groups having from 1 to 18 carbon atoms, and arylene groups or substituted arylene groups having from 6 to 18 carbon atoms.

The composition is coated on a substrate then optionally treated to initiate a free radical reaction. The invention can be applied as a coating to a variety of substrates used in packaging applications.

24 Claims, No Drawings

BARRIER COATINGS

FIELD OF THE INVENTION

The invention relates to coatings containing a polyamine and an ethylenically unsaturated acid which have barrier properties useful in packaging applications. In another aspects, the invention relates to a method of manufacture thereof.

BACKGROUND OF THE INVENTION

It is well known that coatings containing silane compounds and itaconic acid improve the gas, oil, and flavor barrier performance of organic polymer film substrates. Moreover, the adhesion of the coating to the film surface, as well as the improved barrier characteristics provided by the silane coating, are greatly enhanced by exposing the coated film to electron beam radiation. A particularly useful barrier composition is described in U.S. Pat. No. 5,215,822, which teaches a methanol solution of a vinyl benzyl amine silane (Dow Corning Z-60321), itaconic acid, and water; coating this solution on a corona treated low density polyethylene film, drying, and then subjecting the coated film to electron beam radiation grafts the coating to the film surface further improves the barrier properties of the silane coating. However, while this coating gives excellent gas barrier properties at low to moderate relative humidity values, the gas permeability increases drastically at very high relative humidity values.

The present inventors have surprisingly discovered that the combination of a polyamine and an ethylenically unsaturated acid gives excellent gas barrier properties at low to moderate relative humidity values, as well as excellent gas barrier properties at very high relative humidity values. The acid group and the amine form an amine salt which imparts excellent barrier properties to the composition. The composition may be crosslinked to further improve barrier. None of the prior art teaches the present invention. For example, U.S. Pat. No. 4,761,435 claims UV curable polyethylenically unsaturated compositions in combination with a polyamine resin, which use an aryl ketone photosensitizer. The '435 patent teaches that acid functionality in the compositions is undesirable (col. 5, line 24). The patentees indicate that the formation of amine salts is to be avoided, because the photosensitizer reacts only with an amine, and not an amine salt. This is in contrast to the present invention, which teaches that the formation of acid salts is desirable and results in superior barrier properties.

Another example, U.S. Pat. No. 4,943,600, teaches the combination of a tertiary amine containing resin, allyl terminated resin, and a maleate functional resin. Likewise the patentee teaches that the compositions are formulated to minimize or eliminate carboxyl functionality, which contrasts directly with the present invention.

U.S. Pat. No. 5,017,406 claims UV curable compositions which contain reactive unsaturated compounds, but does not teach the use of a polyamine or an unsaturated acid as does the present invention.

JP (Kokail) publication 7-18221 published on Jan. 20, 1995 teaches a surface treatment composition for gas barrier comprising an aminosilane and a compound having an aromatic ring or hydrogenated ring. The present invention is distinguishable, however, because it does not require the addition of cyclic compounds having an aromatic ring, nor does the reference teach the addition of an ethylenically unsaturated acid.

The present invention is distinguishable from the prior art because none teach the addition of an ethylenically unsaturated acid to achieve gas barrier properties.

SUMMARY OF THE INVENTION

The present invention teaches a composition which provides gas, flavor, and aroma barrier to substrates, where the composition is formed by mixing an ethylenically unsaturated acid and a polyamine, wherein said polyamine optionally has a crosslinker reacted therein, and wherein said polyamine has four or more A, B, or C units, where:

A is an $-R^2-N(R^1)_2$ unit, B is an $-R^1-N(R^2-)_2$ unit, and C is an $(-R^2)_3N-$ unit, where:

$R^1$ is independently selected from hydrogen, alkyl, substituted alkyl, aryl, substituted aryl, arylalkyl, and alkylaryl, and $R^2$ is independently selected from the group consisting of: linear or branched alkylene groups or substituted alkylene groups having from 1 to 18 carbon atoms, and arylene groups or substituted arylene groups having from 6 to 18 carbon atoms.

The composition is coated on a substrate then optionally treated to initiate a free radical reaction. The invention can be applied as a coating to a variety of substrates used in packaging applications.

A composition according to the present invention may be employed to provide a barrier layer which improves resistance of the material to transmission of gases and aromas therethrough. For example, a 30 micron uncoated biaxilly oriented, corona treated polypropylene film is generally found to have a permeability to oxygen of 1500 cc/m²/day as measured at ASTM D3985-81 measured at 80% relative humidity. With the present coatings, the oxygen transmission rate of the same film can be reduced to less than 250 cc/m²/day as measured at 80% relative humidity.

DESCRIPTION OF THE PREFERRED EMBODIMENTS

While the invention is susceptible of embodiment in many different forms there is described herein in detail preferred and alternate embodiments of the invention. It should be understood, however, that the present disclosure is to be considered an exemplification of the principles of the invention and is not intended to limit the spirit and scope of the invention and/or claims of the embodiments illustrated.

Polyamines

The polyamines of the present invention are polymeric, homopolymeric or copolymeric polyamines having four or more A, B, or C units, where:

A is an $-R^2-N(R^1)_2$ unit, B is an $-R^1-N(R^2-)_2$ unit, and C is an $(-R^2)_3N-$ unit, where:

$R^1$ is independently selected from hydrogen, alkyl, substituted alkyl, aryl, substituted aryl, arylalkyl, and alkylaryl, and $R^2$ is independently selected from the group consisting of: linear or branched alkylene groups or substituted alkylene groups having from 1 to 18 carbon atoms, and arylene groups or substituted arylene groups having from 6 to 18 carbon atoms.

$R^1$ is independently selected from hydrogen, alkyl, substituted alkyl, aryl, substituted aryl, arylalkyl, alkylaryl, and $R^2$ is independently selected from the group consisting of linear or branched alkylene groups or substituted alkylene groups having from 1 to 18 carbon atoms and arylene groups or substituted arylene groups having 6 to 18 carbon atoms. For example, $R^1$ or $R^2$ can be substituted with hydroxyl groups.

The amines of the present invention preferably have molecular weights of from about 150 to about 2,000,000, with about 400 to about 400,000 preferred, and most preferred being from about 600 to about 80,000. The high degree of polymerization of the amine provides a lower degree of tackiness in the final composition. The lower molecular weight polyamines can be further polymerized to form higher molecular weight polyamines by methods well known in the art, such as by reaction with dialkyl halides (i.e, ethylene dichloride), diisocynates (e.g. tolydiisocyanate, hexamethylene diisocyanate), di(meth)acrylate esters (e.g. hexene diol diacrylate pentaerythritol diacrylate), diepoxides (ethylene glycol diglycidyl ether). Examples of polyamines useful for the invention include polyvinyl amines, aminofunctional polyacryl amides, poly-DADMAC's polyvinyl pyrrolidene copolymers, polyethylenimine and the reaction product of ethylene diamine and epichlorohydic copolymers.

A preferred polyamine that can be used to achieve varying degrees of tackiness is the class of polyamines referred to as polyalkylenimines, such as polyethylenimine, which is readily available in a wide range of molecular weights and different degrees of branching. Polyethylenimines consist of a large family of water-soluble, i.e., hydrophilic, polyamines of varying molecular weight and degree of chemical modification. It is generally known that the polymerization of ethylenimine does not result in a polymer that is completely composed of units having a linear structure, but have a degree of branching, depending on the acid concentration and the temperature during polymerization. This degree of branching may, for example, vary between 12 and 38 percent. The formula of polyethylenimine can be represented in the form of A, B, or C units, where:

A is an —$R^2$—$N(R^1)_2$ unit, B is an —$R^1$—$N(R^2$—$)_2$ unit, and C is an (—$R^2)_3N$—unit, where $R^1$ is hydrogen $R^2$ is an —$CH_2CH_2$—group. The ratio of A to B to C units can be from about 1:0.5:0.5 to about 1:2:1, but is preferably from about 1:1:1 to about 1:2:1.

Additional groups may be grafted onto polyethylenimines using methods well known in the art, to change the affinity of the coating to the substrate, or the adhesive properties. Examples of polyethylenimine modification include reaction with ethylene oxide structures (ethylene oxide, glycidol) to introduce hydroxyl groups, reaction with cyanide and aldehydes followed by hydrolysis to introduce carboxylic acid groups ("Stricken Synthesis"), grafting of phosphoric acid or sulfonic acid groups, and grafting of lipophilic alkyl chains using alkalating agents such as dimethyl sulfate.

Preferred molecular weights of the polyethylenimine are from about 600 to about 80,000. Most preferred molecular weights of the polyethylenimine are from about 600 to about 25,000. Typical polyethylenimines are SZ6050, a silane grafted polyethylenimine available from Dow Corning Toray Silicone (Japan), and SP-103 and SP-110 which are 600 and 1000 molecular weight polyethylenimines available from Nippon Shokubai, (Japan).

Ethylenically Unsaturated Acid

A predetermined quantity of an ethylenically unsaturated acid is also added to the composition. By "ethylenically unsaturated acid" it is meant any acid which has vinyl unsaturation. The ethylenically unsaturated acid is likely to be added in the amount of up to about 80 parts by weight of the composition, with about 5 to about 75 parts by weight being most preferred. The most preferred ethylenically unsaturated acids for use in the present invention are dicarboxylic (i.e. have two carboxylic acid groups) or mono ester thereof and the most preferred is itaconic acid; however, other acids such as fumaric, maleic, citraconic, acrylic, methacrylic, cinnamic, itaconic acid monomethylester, vinylphosphonic acid, sorbic acid, mesaconic acid, and vinyl sulphonic acid may be used as well. The term "ethylenically unsaturated acid" as used herein is meant to include mixtures of one or more of the aforementioned acids. Preferably, the molar ratio of gram atoms of nitrogen in the polyamine to acid groups on the acid is from about 10:1 to about 1:100, with about 5:1 to about 1:10 being preferred and about 2:1 to about 1:4 being most preferred. In fact, the acid can be added to the solubility limit of the ethylenically unsaturated acid, which is typically reached in amounts of up to about 80 parts by weight of the composition.

Solvents

The components of the present invention can optionally be combined in the presence a solvent. In general, water, alcohols and blends thereof will serve as suitable solvents because the polyamine and the ethylenically unsaturated acid are soluble therein. Another highly preferred class of solvents are ether derivatives of mono or polyglycols, such as mono or polyalkylene oxides, which includes solvents like ethylene glycol dimethyl ether. In addition, the selected solvent will preferably wet the substrate. Preferably, the solvent should be non-toxic, and will not extend the drying time of the coating beyond what is commercially acceptable. The amount of solvent can range from about 20 to about 99 parts by weight and is preferably from about 60 to about 95 parts by weight of the composition. Preferred solvents are methanol, ethanol, n-propanol, isopropanol, butanol, and 1-methoxy 2-propanol (available as "Dowanol PM" from The Dow Chemical Company, Midland, Mich.).

Optional Crosslinkers

While the polyamine and the ethylenically unsaturated acid may be combined to form the compositions of the present invention, it is highly preferred that a crosslinker is added to improve the barrier properties, reduce dewetting, and improve appearance. It is believed that a higher crosslink density results in these improved properties. As used herein the term "crosslinker " is defined to mean an agent which can further chain extend and/or crosslink the polyamine. The crosslinker may be an organic crosslinker or more preferably, a reactive silane crosslinker, or mixtures thereof.

Organic Crosslinkers

While the polyamine and the ethylenically unsaturated acid may be combined alone to form the compositions of the present invention, it is preferred that a compound be added that will further chain extend and crosslink the polyamine chain. It is believed that a higher degree of polymerization and crosslinking of the polyamine is desirable to provide improved barrier properties and appearance of the barrier coatings of the present invention. The compounds useful to chain extend and crosslink the polyamine chain include, but are not limited to, multifunctional acrylates, methacrylates, epoxides, isocyanates, thiocyanates, acid halides, acid anhydrides, esters, alkyl halides, aldehydes or combinations thereof. Specific examples include, but are not limited to hexanediol diacrylate, glycidyl methacrylate, ethylenegly-coldigiycidyl ether, and tolyl diisocyanate.

The polyamine can be chain extended and crosslinked either prior to or subsequent to coating the composition on a substrate. Compounds useful to chain extend and crosslink the polyamine coating include those materials which will undergo an acid catalyzed condensation reaction with the nitrogen atom of the polyamine, such as tris-methylol phenol, aldehydes such as formaldehyde and glyoxal, p-benzoquinone, and mixtures of formaldehyde and active methylene compounds that will undergo a Mannich reaction.

The ethylenically unsaturated acid can be crosslinked independently of the polyamine by the addition of multi-functional compounds which will copolymerize with the ethylenically unsaturated acid. These compounds include multifunctional acrylates and methacrylates. In addition, the ethylenically unsaturated acid may be crosslinked directly into the crosslinked polyamine structure by the addition of acrylate and methacrylate functional silane. The acrylate and methacrylate functional silane compounds such as acryloxypropyltrimethoxy silane and methacryloxypropyltrimethoxy silane may be added to the compositions of this invention subsequent to the ethylenically unsaturated acid to crosslink the polyacid. Hydrolysis and condensation of the alkoxy or acyloxy groups subsequent to coating will form a polymeric material with multi functional groups which will copolymerize with the ethylenically unsaturated acid.

The organic crosslinkcers are preferably added in a polyamine/organic crosslinker ratio of about 100:1 to about 1:10, with a preferred ratio being about 10: 1 to about 1:1 and most preferred ratio being about 5: 1 to about 2:1.

Reactive Silane Crosslinker

The most preferred compounds are those which contain both a functional group that will react with a nitrogen atom on the polyamine chain prior to addition of the ethylenically unsaturated acid to the compositions of this invention, as well as a trialkoxy or triacyloxy silane group which will undergo hydrolysis and condensation reaction subsequent to coating the composition of the present invention utilizing an optional solvent containing water.

Because the silane portion of the molecule is terminated with hydroxyl or alkoxy groups, it can condense with the alkoxy portion of other silicone terminated molecules to form Si—O—Si groups. The Si—O—Si bonds increase the crosslink density of the composition. The reactive silane can have the general formula $QSiR_m(OR)_{3-m}$, where Q is any group containing one or more acrylates, aldehydes, methacrylates, acrylamides, methacrylamides, isocyanates. isothiocyanates, anhydrides, epoxides, acid chlorides, linear or branched halogenated alkyl, and halogenated aryl, and m is 0, 1, or 2, and R is a group having from 1 to 4 carbon atoms. Specifically, the reactive silane includes molecules such as gamma-acryloxypropyl trimethoxysilane, gamma-methacryloxypropyl trimethoxysilane.3-glycidoxypropyl trimethoxysilane, chloropropyl trimethoxysilane, chloropropyl triethoxysilane, gamma-isocyanatopropyltriethoxysilane, vinyltriethoxysilane, vinyltrimethoxysilane, vinyl-tris-(2-expoxy cyclohexyl) silane, ethyltrimethoxy silane, chloropropyl triethoxy silane, chloropropyl ethyldimethoxy silane, methyldimethoxy, silane and glycidoxypropyl methyldimethoxy silane. The most preferred reactive silanes are chloropropyl trimethoxysilane available from the Dow Corning Corporation as SZ-6076, chloropropyl triethoxysilane available from the Dow Corning Corporation as SZ-6376 and gamma trimethoxysilylpropyl glycidyl ether, available from the Dow Corning Corporation as Z-6040. It may be necessary to neutralize the polyamine after the reaction of the crosslinker therein, such as by adding sodium methoxde and filtering off the resulting precipitate.

The reactive silanes are preferably added in a polyamine/reactive silane weight ration of about 100:1 to about 1:10, with a preferred ratio being 10:1 to 1:1 and most preferred ratio being about 5:1 to about 2:1.

Coat Weight

The coating can be applied in any desired amount, however, it is preferred that the coating be applied in an amount such that the coat weight is up to about 20 gms/m$^2$, the most preferred coat weight being from about 0.5 to about 10 gms/m2. Coat weight can be determined by gravimetric comparison. The coating can be applied to the substrate by any conventional method, such as spray coating, roll coating, slot coating, meniscus coating, immersion coating, and direct, offset, and reverse gravure coating.

Substrates

The coating can be disposed on a wide variety of substrates, including, but not limited to polyolefins, such as oriented polypropylene (OPP), cast polypropylene, polyethylene and polyethylene copolymers, polystyrene, polyesters, such as polyethylene terephthalate (PET), or polyethylene naphthalate (PEN), polyolefin copolymers, such as ethylene vinyl acetate, ethylene acrylic acid and ethylene vinyl alcohol (EVOH), polyvinylalcohol and copolymers thereof, polyamides, such as nylon, and MXD6, polyimides, polyacrylonitrile, polyvinylchloride, polyvinyl dichloride, polyvinylidene chloride, and polyacrylates, ionomers, polysaccharides, such as regenerated cellulose, and silicone, such as rubbers or sealants, other natural or synthetic rubbers, glassine or clay coated paper, paper board or craft paper, and metallized polymer films and vapor deposited metal oxide coated polymer films, such as $AlO_x$, $SiO_x$, or $TiO_x$.

The aforesaid substrates are likely to be in the form of a film or sheet, though this is not obligatory. The substrate may be a copolymer, a laminate, a coextruded, a blend, a coating or a combination of any of the substrates listed above according to the compatibility of the materials with each other. In addition, the substrate may be in the form of a rigid container made from materials such as polyethylene, polypropylene, polystyrene, polyamides. PET, EVOH, or laminates containing such materials.

The aforesaid substrates may also be pretreated prior to coating by corona treatment, plasma treatment, acid treatments and flame treatments, all of which are known in the art. In addition, the compositions of the present invention can be used as barrier layers on a wide variety of packaging containers, such as pouches, tubes, bottles, vials, bag-in-boxes, stand-up pouches, gable top cartons, thermo-formed trays, brick-packs, boxes, cigarette packs and the like. The compositions of the present invention may be used as laminating adhesives. Of course, the present invention is not limited to just packaging applications, and may be used in any application wherein gas, or aroma barrier properties are desired, such as tires, buoyancy aides, inflatable devices generally, etc.

Any of the foregoing substrates may have primers applied thereon. The primers are applied to the substrates by methods known in the art such as spray coating, roll coating, slot coating, meniscus coating, immersion coating, and direct, offset and reverse gravure coating. Suitable primers include, but are not limited to carbodiimide, polyethylenimine, and silanes, such as N-(2-aminoethyl)-3-aminopropyltrimethoxy silane and aminopropyltriethoxysilane.

Curing

While the compositions of the present invention will form films at ambient conditions, optimum results are achieved by heating and/or free radical cures. The compositions are preferably cured by a free radical generator, such as ultraviolet, electron beam, or gamma radiation or chemical free radical generators such as azo compounds and peroxides. Low energy electron beam is the preferred method of curing because it is cheaper than gamma sources like Cobalt M-60. Its advantage over ultraviolet radiation as a cure system lies in its ability to generate free radicals without photoinitiators. It also imparts higher yields of crosslink density and chemical grafting of the coating to the substrate. Electron beam accelerators of various types such as van de Graaf-type, resonance transformer-type, linear-type, dynamatron-type and high frequency-type can be used as a source of electron beam. Electron beam having energy of from about 5 to about 2000 KeV, preferably from about 50 to about 300 KeV discharged therefrom may be irradiated in a dose of from about 0.1 to about 10 Mrads (Mr). A most preferred dosage is 150 KeV of at least 5 Mr. Low electron beam voltages may be used if the substrate is treated in a vacuum. Commercially available sources of electron beam are Electrocure CB-150 available from Energy Sciences, Inc., Wilmington, Mass.).

The compositions may also be ultraviolet light cured if one or more photoinitiators is added prior to curing. There are no special restrictions on the photoinitiators as long as they can generate radicals by the absorption of optical energy. Ultraviolet light sensitive photoinitiators or blends of initiators used in the UV cure of the present composition include 2-hydroxy-2-methyl-1-phenyl-propan-1-one (Darocure 1173), sold by EM Chemicals, and 2.2 Dimethoxy-2-phenyl-acetol-phenone (Irgacure 651), sold by Ciba-Geigy Corporation, Hawthorne, N.Y. For purposes of this invention, it has been found that from about 0.05 to about 5 weight percent based on the total solids in the composition, of the photoinitiators described therein will cause the composition to cure.

Other types of free radical generators, known to those skilled in the art may also be employed, such as promoted peroxides, azo compounds, etc.

In addition, other methods of curing may be required if a crosslinker is added to the composition. For example if a reactive silane crosslinker is added, the composition may be cured via a condensation reaction, which requires the presence of moisture. The moisture may be present in the coating solution itself, or may be added through steam or in a high humidity oven. The reaction may be accelerated though the presence of heat, for example, by heating in an oven at temperatures up to about 140° C., with temperatures of from about 60° C. to about 120° C. being preferred and temperatures of about 90° C. to about 110° C. being most preferred. Heating time is temperature dependent and the coating will reach tack free time in one to 10 seconds. The heating step serves to evaporate the solvent, and accelerate the condensation reaction between silanol groups. The additional cure chemistries required will depend on the particular crosslinking systems employed, which are well known in the art.

Optional Additives

Various optional additives can be added to the composition to improve various properties as required. These additives may be added as desired and in any amount as long as they do not degrade the performance of the barrier coatings as illustrated herein. Such additives include antiblock and slip aides, such as stearamide, olemide or polar additives, such as epoxides, acrylates, methacrylates, polyols, glycidol, glycidyl methacrylate, ethylene glycol diglycidylether, bisphenol A diglycidylether, or polyamines, such as polyethylenimine and other silanes. Wetting agents, such as polyethoxylated phenol may also be added.

Preferred Embodiment

In accordance with a preferred embodiment of the present invention, 7.93 parts of a solution of sodium methoxide (30% solids in methanol) are added to 100 parts of SZ-6050 50% solids in isopropyl alcohol (IPA). 3.6 parts NaCl are produced by the neutralization and are eliminated by centrifuging the solution. The resulting solution is diluted to 30% solids by adding 61.5 parts IPA per 100 parts of the solution. 100 parts of the neutralized SZ-6050 (30% solids) is then reacted with 76.5 parts of itaconic acid and diluted with 301.75 parts water and 231.75 parts isopropyl alcohol. The solution is coated onto a substrate then treated with a 10 Mrad dose of 175 KV electrons, where it formed a film.

Examples

The oxygen permeability values for each film are given in units of cc/square meter per 24 hours. "dry" values measured at 0% relative humidity using a MOCON Oxtran Model 100 and "wet" values at 80–82% relative humidity utilizing a MOCON Model 2/20 MH. The MOCON instruments were obtained from Modern Controls Corporation. For comparison, the polypropylene base film had a permeability of about 1500 $cc/m^2/24$ hours. In the examples 1–6 cited below, the polyamine was a 700 molecular weight polyethylenimine (PEI) obtained from Aldrich Chemical Company. Itaconic acid was also obtained from Aldrich Chemical Company. A wetting agent "Eccoterge EO-100", was obtained from Eastman Color and Chemical Company. The electron beam was produced by a Pilot Electro curtain electron beam machine provided by Energy Sciences, Inc. The oriented polypropylene (OPP) film was obtained from UCB Films. The Z-6040, gamma-trimethoxysilylpropyl glycidyl ether, was obtained from Dow Corning Corporation, Midland, Mich. The SZ-6050 is a silane grafted polyethylenimine available from Dow Corning Toray Silicone Corp. (Japan), and was prepared by adding 40.5 parts of a 1000 molecular weight polyethylenimine (SP-110, available from Nippon Shokubai, Japan) to 49.3 parts isopropyl alcohol, then heated to 80–90 degrees C. Then 10.2 parts of chloropropyltrimethoxy silane were added and heated at 80–90 degrees C. for two hours. This solution was neutral with NaMeO, then filtered.

Example 1

A quantity of 7.46 g. of PEI was dissolved in 34 g. of isopropyl alcohol (IPA), and 22.54 g. of itaconic acid and 35 g. of water was added and stirred to produce a clear solution. A solution of 0.1 g. of "Eccoterge EO-100" in 100 ml of 50% aqueous IPA was prepared, and 50 g. of the PEI/Itaconic acid solution was diluted by the addition of 10 g. of the wetting agent solution. The resulting 25 weight % solids solution was coated on a corona treated oriented polypropylene film using a #12 Myer Rod. The coat weight was found to be 4.7 g./square meter.

The coated film was dried at 100–110° C. resulting in a clear, transparent tacky coating. The coated film was then subjected to a 10 Mrad dose of 175 KV electrons, where it formed a smooth film.

Example 2

A solution of 7.398 g. of PEI in 25 g. of IPA was prepared, and 0.624 g. of Z-6040 was added. The quantity of Z-6040 corresponds to 0.25 moles per mole of 700 molecular weight PEI. The solution was heated at 60° C. for three hours, then 21.978 g. of itaconic acid was added followed by 10 g. of IPA and 35 g. of water. The mixture was stirred and a clear solution was obtained. 0.1% based on solids, of Eccoterge EO-100 X as added. The solution was diluted to 25% by weight solids with 50% aqueous IPA which was 0.1% by weight Eccoterge EO-100, and coated on corona treated OPP film using a # 12 Myer rod and dried at 100–110° C. for 10 minutes. The coated film was then treated with 10 Mrad dose of 175 KV electrons, where a cured coating was formed on the film.

Example 3

A solution of 7.245 g. of PEI was prepared in 25 g. of IPA and 1.221 g. of Z-6040 was added. This corresponds to 0.50 moles Z-6040 per mole of 700 molecular weight PEI. The solution was maintained at 60° C. for 3 hours, then 21.531 g. of itaconic acid, 10 g. of IPA, and 35 g. of water were added. The mixture was stirred to form a clear solution, and 0.1% by solids Eccoterge EO-100 was added. The solution was diluted to 25% solids using the diluting solution described in Example 2. It was coated, dried, and subjected to the electron beam as described in Example 2. The coated film was essentially tack free. At 0% relative humidity, the coating gave an oxygen permeability of 110 cc/square meter/24 hours. At 80 relative humidity, the permeability was 16 cc/square meter/24 hours.

Example 4

A solution of 7.101 g. of PEI was prepared in 25 g. of IPA and 1.797 g. of Z-6040 was added and the solution was maintained at 60° C. for 3 hours. The quantity of Z-6040 corresponds to 0.75 moles per mole of 700 molecular weight PEI. A total of 21.102 g. of itaconic acid, 10 g. of IPA, and 35 g. of water was added and stirred to obtain a clear solution, and 0.1% by weight solids Eccoterge EO-100 was added. The solution was diluted, coated on corona treated OPP, dried and cured as described in Example 2. The coating was quite flexible at 0%, relative humidity and the oxygen permeability was 0.9 and 19 cc/square meter/24 hours at 0% and 80% relative humidity, respectively.

Example 5

A solution of 6.963 g. of PEI was prepared in 25 g. of IPA and 2.346 g. of Z-6040 was added and the solution was maintained at 60° C. for 3 hours. The quantity of Z-6040 corresponds to one mole of Z-6040 per mole of 700 molecular weight PEI. To this solution was then added 10 g. of IPA, 20.691 g. of itaconic acid, and 35 g. of water, and it was stirred to produce a clear solution. Eccoterge EO-100 in the amount corresponding to 0.1% based on solids was added. The solution was diluted, coated on corona treated OPP, dried and cured as described in Example 2. The coating had a dry permeability of 30.5 cc/square meter/24 hours, but a wet permeability of only 14 cc/square meter/24 hours.

Example 6

A solution of 6.459 g. of PEI was prepared in 25 g. of IPA, and 4.353 g. of Z-6040/mole of 700 molecular weight PEI. The solution was maintained at 60° C. for three hours, and 19.188 g. of itaconic acid was added along with 10 g. IPA and 35 g. water. The mixture was stirred to form a clear solution, and then Eccoterge EO-100 in an amount corresponding to 0.1% based on solids was added. The solution was coated, dried, and cured as described in Example 2. The oxygen permeability was measured, giving 58 and 47 cc/square meter/24 hours when it was measured at 0% and 80% relative humidity, respectively.

Example 7

A 25 weight percent coating solution containing polyethylenimine, glycidyl methacrylate as a crosslinker, and itaconic acid in a 1:0.5:16 molar ratio in 50% aqueous isopropanol and containing 0.1% wetting agent was prepared as follows:

A solution of 6.138 g. of polyethylenimine, molecular weight 700, was prepared in 25 g. of isopropyl alcohol, then 0.623 g. of glycidyl methacrylate was added. The solution was allowed to stand overnight at ambient temperature. A quantity of 12.5 g. of isopropanol containing 0.025 g. of "Eccoterge EO-100" was added to the solution, followed by 18.24 g. of itaconic acid and 37.5 g. of water. The mixture was stirred until a clear solution was obtained. It was coated on corona treated polypropylene film using a #12 Myer rod, and the coated film was dried in a 100° oven for 10 minutes. It was then treated with a 10 Mrad dose of 175 KV electrons. The oxygen permeability was 140 and 38 cc/24 hours/square meters at 0% and 80% relative humidity, respectively.

Example 8

Coating solutions containing the reaction product of Z6020 and pentaerythritol tetraacrylate, with itaconic acid in a 4:1:10.4 molar ratio were blended with a solution of polyethylenimine molecular weight 1.7 million, with added itaconic acid. A 20 weight percent coating solution was prepared in 50% aqueous isopropanol by the following method. A solution of 10.864 g. of pentaerythritol tetraacrylate (PETA) in 160 g. of dry isopropanol was prepared and 6.852 g. of Z-6020 was added. The solution was allowed to stand at ambient temperature for one hour, then 41.278 g. of itaconic acid was added followed by 160 g. of water. The mixture was stirred to form a clear solution, referred to here as "Solution A". A 20 weight percent solution of 1.7 million molecular weight polyethylenimine and itaconic acid containing one mole of itaconic acid per gram atom of nitrogen was prepared as follows: A 100 g. quantity of "Polymin SK" a 24 weight percent solution of a 1.7 million molecular weight polyethylenimine, obtained from BASF Corporation, was diluted with 80 g. of itaconic acid which were added together slowly. Stirring was continued until a clear solution was obtained. This solution is now referred to as "Solution B". In a similar manner, a solution referred to here as "Solution C" was prepared from 100 g. of "Polymin SK", 67 g. water, 93 g. of isopropanol, and 60 g. of itaconic acid. In a similar manner, a solution referred to here as "Solution D" was prepared from 100 g. of "Polymin SK", 82 g. water, 158 g. of isopropanol, and 55 g. of itaconic acid.

Coating solutions were prepared as indicated below, and applied to corona treated polypropylene film to give a coat weight of 3.0–3.5 g./square meter, dried in a circulating air oven for 3 minutes, then treated with a 10 Mrad dose of 165 Kv electrons using a laboratory model electron beam generator supplied by Energy Sciences. Inc. The permeability values are given in cc/square meter/24 hours.

Sample 1: 60 g. Solution A –40 g. Solution B. The oxygen permeability was 0.2 at 0% relative humidity and 59 at 80% relativity.

Sample 2: 40 g. Solution A +60 g. Solution C. The oxygen permeability was 2.0 at 0% relative humidity and 61 at 80% relativity.

Sample 3: 240 g. Solution A +80 g. Solution D. The oxygen permeability was 0.1 at 0% relative humidity and 81 at 80% relativity.

For Examples 9–10, the solutions were coated with an RK coater and dried for 10 minutes at room temperature before being passed through a drying tunnel at 60° C. 5m/ min. Films were then immediately treated by ED, at a voltage of 170 KV and a dose of 10 Mrads. In the following examples, SZ-6050 is a silane grafted polyethylenimine available from Dow Corning Toray Silicone (Japan).

Example 9

7.93 g. of a solution of sodium methoxide (30% solids in methanol) were added to 100 g. of SZ-6050 50% solids in IPA. 3.68 g. NaCl were produced by the neutralization and were eliminated by centrifuging the solution. The resulting solution was diluted to 30% solids by adding 61.5 g. IPA by 100 g. of solution. 10 g. of the neutralized SZ6050 (30% solids) were reacted with 7.65 g. itaconic acid and diluted with 30.175 g. water and 23.175g. isopropyl alcohol. Different coat weights were measured by weighing the films before and after washing them off with NaOH 5% in IPA/MeOH/water (1:1:1).

| | Neutralized SZ-6050/ITA(1/23) | | |
|---|---|---|---|
| K-bar | Coatweight (gsm) | Dry OTR | Wet OTR |
| Yellow | 0.69 | 59 | 43.4 |
| Red | 1.40 | 96 | 14.2 |
| Green | 3.03 | 125 | 4.75 |
| Orange | 7.21 | 133 | 0.15 |
| Brown | 7.21 | 200 | Not measured |

Example 10

PEI/ITA (1:581), 15% solids in IPA/water (1:1): 10 g. PEI of 25,000 molecular weight were added to 30.2 g. itaconic acid in 46.9 g. of isopropyl alcohol and 46.9 g. water. This corresponds to 1 mole of itaconic acid per mole of nitrogen.

| K-bar | Coatweight (gsm) | Dry OTR | Wet OTR |
|---|---|---|---|
| Yellow | 0.69 | 0.58 | 136.7 |
| Red | 1.40 | 1.50 | 37.9 |
| Green | 3.03 | 3.27 | 10.7 |
| Orange | 7.00 | NM (*) | |
| Brown | 7.21 | 10.83 | 0.14 |

(*) Coating in the same conditions resulted in a coatweight of about 7 gsm.

Example 11

A solution of 3.806 g. of polyethylenimine with a molecular weight of 25.000 was prepared in 85 g. of water which contained 0.015 g. of n "Eccoterge EO-100". A quantity of 8.62 g. of itaconic acid and 2.566 g. of fumaric acid were then added and warmed and stirred to give a clear solution. The solution was coated on corona treated OPP film using a # 12 Myer rod, and the coated film was dried in an oven at 90–100° C. for 10 minutes, then treated with a 10 Mrad dose of 175 KV electrons. The sample after treatment with the electron beam was tack free and had a dry oxygen permeability of 55 cc/square meter/24 hours.

Example 12

A solution of 3.729 g. of polyethylenimine with a molecular weight of 25,000 was prepared in 85 g. of water which contained 0.015 g. of "Eccoterge EO-100". A quantity of 11.271 g. of citraconic acid was added with stirring to give a clear solution which was coated on corona created OPP film using a #f12 Myer rod. The coated film was dried for 10 minutes in an oven at 90–100° C. and then treated with a 10 Mrad dose of 175 KV electrons. The cured coated film had a dry oxygen permeability of 12 cc/square meter/24 hours.

What is claimed is:

1. A composition comprising:
   an ethylenically unsaturated acid selected from itaconic, fumaric, maleic, citraconic, acrylic, methacrylic, and cinnamic, itaconic acid monomethylester, vinylphosphonic acid, mesaconic acid, sorbic acid, and vinyl sulphonic acid, and mixtures thereof, and a polyamine wherein the composition has a crosslinker reacted therein and in the said polyamine has four or more A, B, or C units, where:
   A is an $-R^2-N(R^1)_2$ unit, B is an $-R^1-N(R^2-)_2$ unit, and C is an $(-R^2)_3N-$ unit, where:
   $R^1$ is independently selected from hydrogen, alkyl, substituted alkyl, aryl, substituted aryl, arylalkyl, and alkylaryl, and
   $R^2$ is independently selected from the group consisting of: linear or branched alkylene groups or substituted alkylene groups having from 1 to 18 carbon atoms, and arylene groups or substituted arylene groups having from 6 to 18 carbon atoms,
   wherein the molar ratio of nitrogen atoms on the polyamine to the acid groups on the ethylenically unsaturated acid is from 10:1 to 1:100, the composition is dissolved in a solvent and the solvent is selected from the group consisting of water, alcohol, ether derivatives of mono and poly glycols, and mixtures thereof, and the solvent constitutes 60–95 parts by weight of the total composition.

2. The composition according to claim 1, wherein the composition includes an additive.

3. The composition according to claim 2, wherein the additive is selected from antiblock and slip aides, polar additives, a silane, an acrylate or methacrylate, polyethylenimine, glycidyl methacrylate, glycidol, ethyleneglycol diglycidylether, bisphenol A diglycidylether and wetting agents.

4. The composition according to claim 1, wherein the polyamine is polyethylenimine.

5. The composition according to claim 4, wherein the polyethylenimine has a molecular weight in the range of 600 to 25,000.

6. The composition according to claim 1, wherein the crosslinker is an organic crosslinker.

7. The composition according to claim 4, wherein the organic crosslinker is selected from the group consisting of: multifunctional acrylates, methacrylates, epoxides, isocyanates, thiocyanates, acid halides, acid anhydrides, esters, alkyl halides and aldehydes, and combinations thereof.

8. The composition according to claim 1, wherein the crosslinker is a reactive silane having the general formula $QSiR_m(OR)_{3-m}$,
   where Q contains a group selected from the group consisting of: acrylates, aldehydes, methacrylates, acrylamides, methacrylamides, isocyanates, isothiocyanate, anhydrides, epoxides, acid chlorides, linear or branched halogenated alkyl, and halogenated aryl, and m is 1, 2 or 3, and R is a group having 1 to 4 carbon atoms, and in that said composition has optionally been neutralized.

9. The composition according to claim 6, wherein the reactive silane is selected from:

gamma-acryloxypropyl trimethoxysilane, gamma-methacryloxypropyl trimethoxysilane, 3-glycidoxypropyl trimethoxysilane, chloropropyl trimethoxysilane, chloropropyl triethoxysilane, gamma-isocyanatopropyltriethoxysilane, vinyltriethoxysilane, vinyltrimethoxysilane, vinyltris-(2-expoxy cyclohexyl) silane and ethyltrimethoxy silane, chloropropyl triethoxy silane, chloropropyl ethyldimethoxy silane, methyldimethoxy silane and glycidoxypropyl methyldimethoxy silane, and said composition has optionally been neutralized.

10. The composition according to claim 1, wherein the composition is coated on a substrate.

11. A method for the manufacture of a substrate having barrier properties comprising the steps of coating a substrate with a composition according to claim 1; and treating the coated substrate of step (I) to initiate a free radical reaction.

12. The method according to claim 11, wherein the free radical reaction is initiated by electron beam radiation, gamma radiation or ultraviolet radiation, optionally in the presence of photoinitiators, or said free radical reaction is initiated thermally in the presence of a free radical generator.

13. The method according to claim 12, wherein the treatment of step (II) is performed by electron beam radiation oat from 5 KeV to 2000 KeV and greater than 0.1 Mrads.

14. The method according to claim 13, wherein the treatment step (II) is performed by electron beam radiation at 150 KV and at least 5 Mrads.

15. The method according to claim 11, wherein the coated substrate of step (I) is heated.

16. The method according to claim 15, wherein the coated substrate of step (I) is heated in the presence of moisture.

17. The method according to claim 11 wherein the substrate of step (I) is treated with a primer.

18. The method according to claim 17, wherein the primer is selected from the group consisting of a silane, polyethylenimine, and carbodiimide.

19. The method according claim 11 wherein the substrate is selected from the group consisting of polyolefins, including oriented polypropylene (OPP), cast polypropylene, polyethylene and polyethylene copolymer, polystyrene; polyesters, including polyethylene terephthalate (PET), or polyethylene naphthalate (PEN); polyolefin copolymers, including ethylene vinyl acetate, ethylene acrylic acid and ethylene vinyl alcohol (EVOH), polyvinylalcohol and copolymers thereof; polyamides, including nylon, and MXD6; polyimides; polyacrylonitrile; polyvinylchloride; polyvinyl dichloride; polyvinylidene chloride; polyacrylates; isonomers, polysaccharides, including regenerated cellulose; silicone, including rubbers or sealants; natural or synthetic rubbers; glassine or clay coated paper, paper board; craft paper; and metallized films and vapor deposited metal oxide coated polymer films, including AlOx, SiOx, or TiOx.

20. The method according to claim 11 wherein the treated substrate of step (II) is disposed on one or more additional substrates to form a laminate, and said additional substrate or substrates are optionally treated with a primer.

21. The method according to claim 20, wherein the additional substrates used to form the laminate are selected from the group consisting of polyolefins, including oriented polypropylene (OPP), cast polypropylene, polyethylene and polyethylene copolymer; polystyrene; polyester, including polyethylene terephthalate (PET), or polyethylene naphthalate (PEN); polyolefin copolymers, including ethylene vinyl acetate, ethylene acrylic acid and ethylene vinyl alcohol (EVOH), polyvinylalcohol and copolymers thereof; polyamides, including nylon, and MXD6; polyimides; polyacrylonitrite; polyvinylchloride; polyvinyl dichloride; polyvinylidene chloride; polyacrylates; ionomers; polysaccharides, including regenerated cellulose; silicone, including rubbers or sealants; natural or synthetic rubbers; glassine or clay coated paper; paper board; craft paper; and metallized films and vapor deposited metal oxide coated polymer films, including AlOx, SiOx, or TiOx.

22. A packaging container comprising at least one barrier layer forming an integral part of said packaging container, wherein said barrier layer is formed by coating a substrate with a composition according to anyone of claims 1 to 10; and treating the coated substrate of step (II) to initiate a free radical reaction.

23. The packaging container according to claim 22, wherein the container is selected from the group consisting of: pouches, tubes, bottles, vials, bag-in-boxes, stand-up pouches, gable top cartons, thermo-formed trays, brick-packs, boxes, and cigarette packs.

24. The composition according to claim 5, wherein the composition is coated on a substrate.

* * * * *